United States Patent [19]
Wu et al.

[11] Patent Number: 6,080,697
[45] Date of Patent: Jun. 27, 2000

[54] PROCESS FOR MAKING A COMPOSITION THAT IS USEFUL FOR CONVERTING LOWER VALUE AROMATICS TO HIGHER VALUE AROMATICS

[75] Inventors: An-hsiang Wu, Bartlesville; Charles A. Drake, Nowata, both of Okla.

[73] Assignee: Phillips Petroleum Company, Bartlesville, Okla.

[21] Appl. No.: 09/167,910

[22] Filed: Oct. 7, 1998

[51] Int. Cl.[7] .............................. B01J 29/04; B01J 29/06; B01J 31/00; B01J 27/14

[52] U.S. Cl. ................................. 502/60; 502/63; 502/64; 502/68; 502/121; 502/131; 502/208

[58] Field of Search ..................... 423/700, 701, 423/702; 502/60, 63, 64, 68

[56] References Cited

U.S. PATENT DOCUMENTS

| | | | |
|---|---|---|---|
| 4,278,827 | 7/1981 | Chu et al. ............................... | 585/467 |
| 4,379,761 | 4/1983 | Olson et al. ............................ | 252/435 |
| 4,394,300 | 7/1983 | Chu et al. ............................... | 252/455 |
| 4,495,041 | 1/1985 | Goldstein ............................... | 204/158 R |
| 4,632,911 | 12/1986 | Goldstein ............................... | 502/62 |
| 4,950,835 | 8/1990 | Wang et al. ............................ | 585/467 |
| 5,406,015 | 4/1995 | Beck et al. ............................. | 585/475 |
| 5,602,066 | 2/1997 | Beck et al. ............................. | 502/64 |
| 5,610,112 | 3/1997 | Lago et al. ............................. | 502/63 |
| 5,612,270 | 3/1997 | Beck et al. ............................. | 502/64 |
| 5,675,047 | 10/1997 | Beck et al. ............................. | 585/467 |
| 5,710,085 | 1/1998 | Absil et al. ............................. | 502/68 |
| 5,726,114 | 3/1998 | Chang et al. ........................... | 502/64 |
| 5,863,418 | 1/1999 | Heyse et al. ........................... | 208/135 |

*Primary Examiner*—Steven P. Griffin
*Assistant Examiner*—Cam N. Nguyen
*Attorney, Agent, or Firm*—Richmond, Hitchcock, Fish & Dollar

[57] ABSTRACT

A process to produce a composition is provided. Said process comprises: contacting a zeolite component, a silicon component, a Group 14 metal component, and a phosphorus component together to form a first mixture; treating said first mixture to form a second mixture; contacting said second mixture with a binder component to form a third mixture; agglomerating said third mixture to form a fourth mixture; and treating said fourth mixture to form said composition.

10 Claims, No Drawings

PROCESS FOR MAKING A COMPOSITION THAT IS USEFUL FOR CONVERTING LOWER VALUE AROMATICS TO HIGHER VALUE AROMATICS

FIELD OF THE INVENTION

This invention is related to the field of processes used to produce compositions, where said compositions can be used to convert alkylaromatic compounds to dialkylaromatic compounds.

BACKGROUND OF THE INVENTION

The production of dialkylaromatic compounds from alkylaromatic compounds is a multimillion dollar business. Millions of dollars have been spent on research to improve these production processes. This is because of the large scale economics that are involved. That is, even small improvements in these processes can add millions of dollars to the bottom line. Consequently, research is on-going to find new and useful ways to produce these dialkylaromatic compounds.

SUMMARY OF THE INVENTION

It is an object of this invention to provide a process to produce a composition.

It is another object of this invention to provide said composition.

It is another object of this invention to provide a process to use said composition.

In accordance with this invention a process to produce a composition is provided. Said process comprises (optionally, consists essentially of, or consists of):

(1) contacting
　(1.1) a zeolite component,
　(1.2) a silicon component,
　(1.3) a Group 14 metal component, and
　(1.4) a phosphorus component
　together to form a first mixture;
(2) treating said first mixture to form a second mixture;
(3) contacting said second mixture with a binder component to form a third mixture;
(4) agglomerating said third mixture to form a fourth mixture; and
(5) treating said fourth mixture to form said composition.

In accordance with this invention said composition produced by this process is provided.

In accordance with this invention a process of using said composition to convert alkylaromatic compounds to dialkylaromatic compounds.

These and other objects will become more apparent with the following.

The terms "comprise", "comprises" and "comprising" are open-ended and do not exclude the presence of other steps, elements, or materials that are not specifically mentioned in this specification.

The phrases "consists of" and "consisting of" are closed ended and do exclude the presence of other steps, elements, or materials that are not specifically mentioned in this specification, however, they do not exclude impurities normally associated with the elements and materials used.

The phrases "consists essentially of" and "consisting essentially of" do not exclude the presence of other steps, elements, or materials that are not specifically mentioned in this specification, as along as such steps, elements, or materials, do not affect the basic and novel characteristics of the invention, additionally, they do not exclude impurities normally associated with the elements and materials used.

The above terms and phrases are intended for use in areas outside of U.S. jurisdiction. Within the U.S. jurisdiction the above terms and phrases are to be applied as they are construed by U.S. courts and the U.S. Patent Office.

DETAILED DESCRIPTION OF THE INVENTION

The zeolite component comprises a zeolite that has been treated with an acid to form an acid treated zeolite (sometimes called HZSM). Methods of making such acid treated zeolites are known in the art. The zeolite component preferably has a constraint index from about 0.1 to about 12. However, it is preferred when the constraint index is from about 2 to about 9. The constraint index can be determined in accordance with procedures known in the art, preferably, in accordance with U.S. Pat. No. 4,097,367. Examples of zeolites include, but are limited to, ZSM-5; ZSM-8, ZSM-11, ZSM-12, ZSM-35, and ZSM-38. Mixtures of these zeolites can be used. Currently, it is preferred to use ZSM-5.

The silicon component comprises any compound that contains silicon, where said compound contains silicon-oxygen bonds or where said compound is convertible to a compound that contains silicon-oxygen bonds under the treating conditions of step (2). Inorganic and organic compounds can be used. However, organic silicon compounds are preferred. Examples of such silicon components are poly(methylphenylsiloxane), tetraethoxysilicon, and tetraethylorthosilicate. Mixtures of silicon components can be used. Currently, tetraethylorthosilicate is preferred.

The Group 14 metal component comprises any compound that contains a Group 14 metal, where said compound contains Group 14 metal-oxygen bonds or where said compound is convertible to a compound that contains Group 14 metal-oxygen bonds under the treating conditions of Step (2). The Group 14 metals are, for the purposes of this invention, germanium, tin, and lead. However, currently tin is preferred. Inorganic and organic compounds can be used. However, organic tin compounds are preferred. Examples of such Group 14 metal components are tributyl tin acetate, tributyl germanium acetate, and tributyl lead acetate. Mixtures of Group 14 metal components can be used. Currently, tributyl tin acetate is preferred.

The phosphorus component comprises any compound that contains phosphorus, where said compound contains phosphorus-oxygen bonds or where said compound is convertible to a compound that contains phosphorus-oxygen bonds under the treating conditions of step (2). Inorganic and organic compounds can be used. However, organic phosphorus compounds are preferred. An example of such a phosphorus component is tributyloxy phosphate. Other phosphorus components can be found in Strem Catalog 17, (1997–1999) by the Strem Chemicals Company. Mixtures of phosphorus components can be used. Currently, tributyloxy phosphate "$(C_4H_9O)_3PO$" is preferred.

These components can be contacted in any manner known in the art that will form a mixture. One method is simply mixing all of the components together in a container. Another method is mixing the components in a sequential manner. This forms the first mixture.

The amount of silicon component to use to form the first mixture is from about 1 to about 1000 weight percent, preferably from about 10 to about 500 weight percent, and most preferably from about 50 to 150 weight percent, where said weight percent is based on the weight of the zeolite component.

The amount of Group 14 metal component to use to form the first mixture is from about 1 to about 100 weight percent, preferably from about 2 to about 75 weight percent, and most preferably from about 5 to 50 weight percent, where said weight percent is based on the weight of the zeolite component. However, in any case, it is most preferred that the amount of the Group 14 metal in the composition is from about 0.1 to about 10 weight percent, preferably from about 0.2 to about 5 weight percent, and most preferably from about 0.5 to 2 weight percent, where said weight percent is based on the weight of the composition.

The amount of phosphorus component to use to form the first mixture is from about 0.1 to about 50 weight percent, preferably from about 1 to about 25 weight percent, and most preferably from about 2 to 10 weight percent, where said weight percent is based on the weight of the weight of the zeolite component. However, in any case, it is most preferred that the amount of the phosphorus in the composition is from about 0.01 to about 10 weight percent, preferably from about 0.05 to about 5 weight percent, and most preferably from about 0.1 to 2 weight percent, where said weight percent is based on the weight of the composition.

The first mixture is then subjected to a treating step to form said second mixture. The function of said treating step is to remove substantially all of the water in said first mixture, and to convert any silicon components, Group 14 metal components, and/or phosphorus components, which are not oxides, into an oxide. If any silicon components, Group 14 metal components and/or phosphorus components need to be converted to an oxide, substantially all of said component needs to be converted.

The term "substantially all" means that any residual water and unconverted components do not affect the use of the composition in the desired process. Preferably less than 10 weight percent water is left in the composition, and preferably, less than 10 weight percent unconverted components are left in the composition.

The temperature for such treating can be from about 100° C. to about 1000° C., preferably from about 150° C. to about 900° C., and most preferably from 200° C. to 800° C. The pressure of such treating can be from below atmospheric to superatmospheric, however, atmospheric is preferred. The time period for treating is from about 0.1 to about 100 hours.

After the second mixture is formed it is contacted with a binder component to form a third mixture. The binder component comprises a compound that is an oxide, or a compound that is convertible to a oxide during treating step (5), where said oxide contains a Group 2, 13–15 element (See Hawley's Condensed Chemical Dictionary, 11th Edition, 1987). Examples of such binder components are chlorhydrol, alumina, silica, aluminum phosphate, and clays. Mixtures of these binder components can be used. Currently it is preferred to use Ludox AS-40 which is a silica in an liquid solution and which is available from DuPont Chemical Company.

The amount of binder component to use to produce the third mixture varies with the intended application of the composition. However, from about 1 to about 200 weight percent, preferably about 5 to about 100 weight percent, and most preferably 10 to about 50 weight percent of the binder is used, where said weight percent is based on the weight of the second mixture.

The third mixture is then agglomerated to form a fourth mixture. Various methods are known to agglomerate mixtures, such as, for example, extrusion, spray-drying, and pelletizing.

After the fourth mixture is produced it is subjected to a treating step to form the composition. The function of said treating step is to remove substantially all of the water in said fourth mixture and to convert any binder components, which are not oxides, into an oxide. If any binder components needs to be converted to an oxide, substantially all of said binder component needs to be converted.

All treating steps are preferably conducted in the presence of an oxygen containing ambient.

The composition produced by this process will have phosphorus and a Group 14 metal incorporated into the composition. This composition can be used in a process to convert alkylaromatic compounds into dialkylaromatic compounds. An example of such a process is using said composition to convert toluene into xylene. Process conditions are known in the art, and can be readily used with this composition.

EXAMPLES

Example One (Inventive)

Five parts of a zeolite component (HZSM-5 obtained from UOP) was mixed with five parts of a 10 weight percent solution of tetraethylorthosilicate in cyclohexane, 1.67 parts of a 7.5 weight percent solution of tributyl tin acetate in cyclohexane, and 0.100 parts tributyloxy phosphate to form a first mixture. The first mixture was allowed to dry at room temperature and pressure for about three hours. The first mixture was then treated by subjecting it to a temperature of about 538° C. for about 6 hours at about atmospheric pressure to form a second mixture. This second mixture was mixed with 5 parts Ludex AS-40 to form a third mixture. This third mixture was then extruded to form a fourth mixture ($\frac{1}{16}$ inch extrudates). This fourth mixture was then treated by subjecting it to a temperature of about 538° C. for about 6 hours at about atmospheric pressure to form said composition. This composition had about 0.697 weight percent tin and 0.191 weight percent phosphorus based on the weight of the composition. This composition was then tested in a process to convert toluene into xylene. See Table A.

Example Two (Comparative)

Five parts of a zeolite component was mixed with five parts of cyclohexane, 1.67 parts of a 7.5 weight percent solution of tributyl tin acetate in cyclohexane, and 0.100 parts tributyloxy phosphate to form a first mixture. The first mixture was allowed to dry at room temperature and pressure for about 3 hours. The first mixture was then treated by subjecting it to a temperature of about 538° C. for about 6 hours at about atmospheric pressure to form a second mixture. This second mixture was mixed with 5 parts Ludex AS-40 to form a third mixture. This third mixture was then extruded to form a fourth mixture ($\frac{1}{16}$ inch extrudates). This fourth mixture was then treated by subjecting it to a temperature of about 538° C. for about 6 hours at about atmospheric pressure to form a first comparative composition. This first comparative composition had about 0.700 weight percent tin and 0.192 weight percent phosphorus based on the weight of this first comparative composition. This first comparative composition was then tested in a process to convert toluene into xylene. See Table A.

Example Three (Comparative)

Five parts of a zeolite component was mixed with five parts of a 10 weight percent solution of tetraethylorthosilicate in cyclohexane to form a first mixture. The first mixture was allowed to dry at room temperature and pressure for about three hours. The first mixture was then treated by subjecting it to a temperature of about 538° C. for about 6 hours at about atmospheric pressure to form a second mixture. This second mixture was mixed with 5 parts Ludex AS-40 to form a third mixture. This third mixture was then extruded to form a fourth mixture (1/16 inch extrudates). This fourth mixture was then treated by subjecting it to a temperature of about 538° C. for about 6 hours at about atmospheric pressure to form a second comparative composition. This second comparative composition was then tested in a process to convert toluene into xylene. See Table A.

TABLE A

| Example Number | Time (hours) | Temperature (° C.) | Toluene[1] | Selectivity | | | |
|---|---|---|---|---|---|---|---|
| | | | | $C_6$-[3] | Benzene[4] | Xylene[5] | Xylene[2] |
| 1 | 7.09 | 433 | 35.184 | 1.373 | 46.470 | 47.934 | 16.865 |
| 2 | 7.00 | 430 | 29.558 | 1.729 | 54.215 | 41.251 | 12.193 |
| 3 | 7.3 | 429 | 18.134 | 2.421 | 60.637 | 34.455 | 6.248 |

[1]This is the weight percent of toluene converted into products based on the total weight of toluene in the process.
[2]This is the weight percent of xylene produced based on the weight of toluene converted.
[3]This is the weight percent of other $C_6$-($C_1$, $C_2$, $C_3$, $C_4$, $C_5$, $C_6$,) compounds produced based on the weight of toluene converted.
[4]This is the weight percent of benzene produced based on the weight of toluene converted.
[5]This is the weight percent of xylene produced based on the weight of toluene converted.

That which is claimed is:

1. A process to produce a composition, said process consisting essentially of:
   (1) contacting
      (1.1) a zeolite,
      (1.2) an organic silicon compound,
      (1.3) a Group 14 metal compound, and
      (1.4) a phosphorus compound together to form a first mixture;
   (2) treating said first mixture to form a second mixture, wherein the temperature used in the treating step (2) is sufficient to remove substantially all of the water in said first mixture and to convert silicon compound and phosphorus compound to oxides up to about 1000° C.;
   (3) contacting said second mixture with a binder that is a compound containing a Group 2, 13–15 element, to form a third mixture, where said binder comprises a compound that is an oxide, or a compound that is convertible to an oxide during step (5);
   (4) agglomerating said third mixture to form a fourth mixture; and
   (5) treating said fourth mixture to form said composition, wherein the temperature used in treating step (5) is sufficient to remove substantially all of the water in said fourth mixture and to convert said silicon compounds, said phosphorus compounds and said binder compounds to oxides up to about 1000° C.

2. A process according to claim 1 wherein said zeolite component comprises a zeolite that has a constraint index is from about 2 to about 9.

3. A process according to claim 2 wherein said Group 14 metal component is an organo tin compound.

4. A process according to claim 3 wherein said phosphorus compound is an organic phosphorus compound.

5. A process according to claim 4 wherein the amount of silicon compound used to form the first mixture is from about 10 to about 500 weight percent, where said weight percent is based on the weight of the zeolite.

6. A process according to claim 5 wherein the amount of Group 14 metal compound in said composition is from about 0.2 to about 5 weight percent, where said weight percent is based on the weight of the composition.

7. A process according to claim 6 wherein the amount of phosphorus compound used to form the first mixture is from about 2 to about 10 weight percent, where said weight percent is based on the weight of the zeolite.

8. A process according to claim 7 wherein the temperature used in treating step (2) is from about 150° C. to about 900° C.

9. A process according to claim 8 wherein said binder component is used in an amount from about 5 to about 100 weight percent, where said weight percent is based on the weight of the second mixture.

10. A process according to claim 9 wherein the temperature used in treating step (5) is from about 150° C. to about 900° C.

* * * * *